L. H. HALL.
CLUTCH MECHANISM.
APPLICATION FILED JAN. 26, 1910.
977,864.
Patented Dec. 6, 1910.
2 SHEETS—SHEET 2.
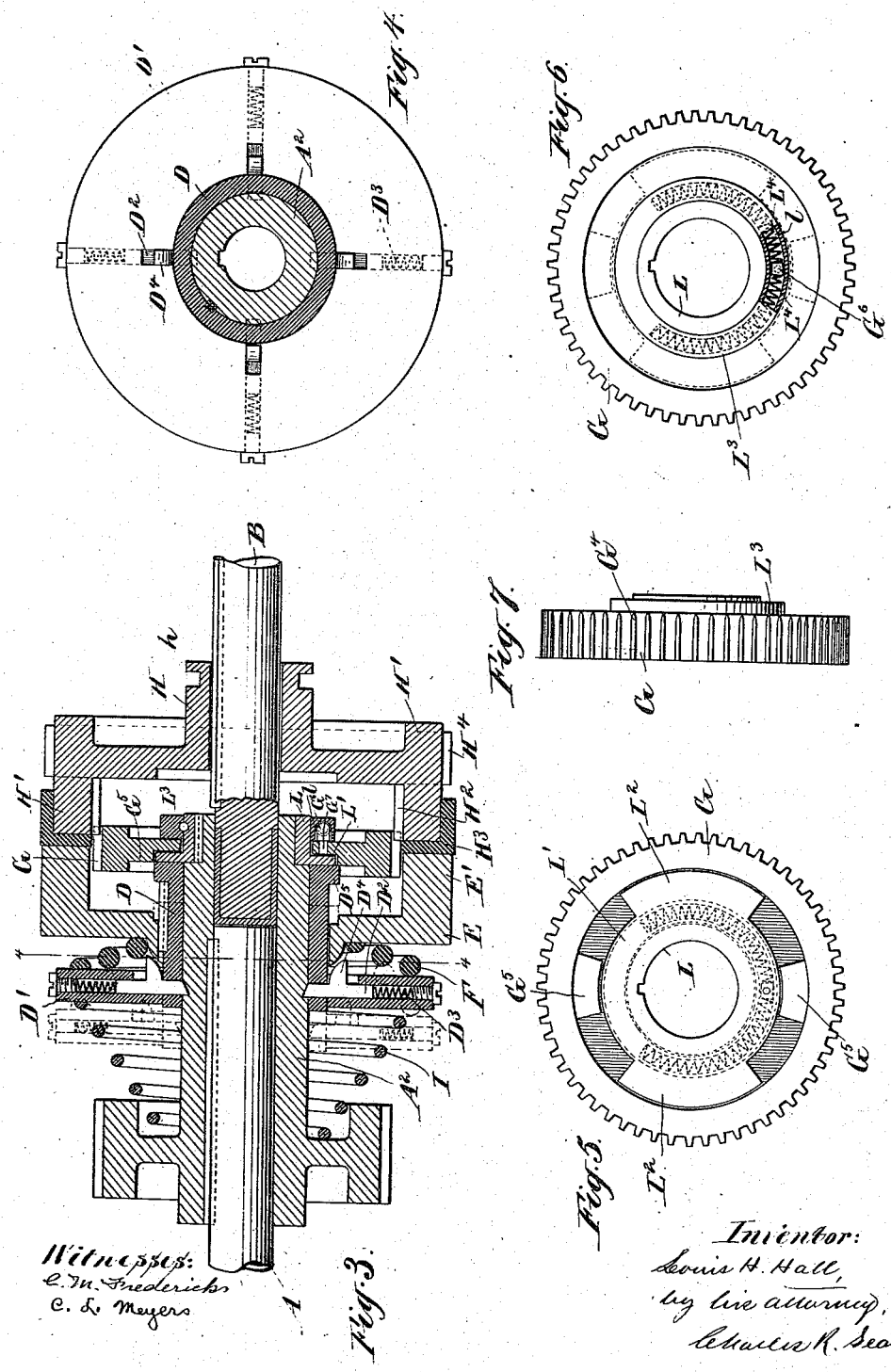

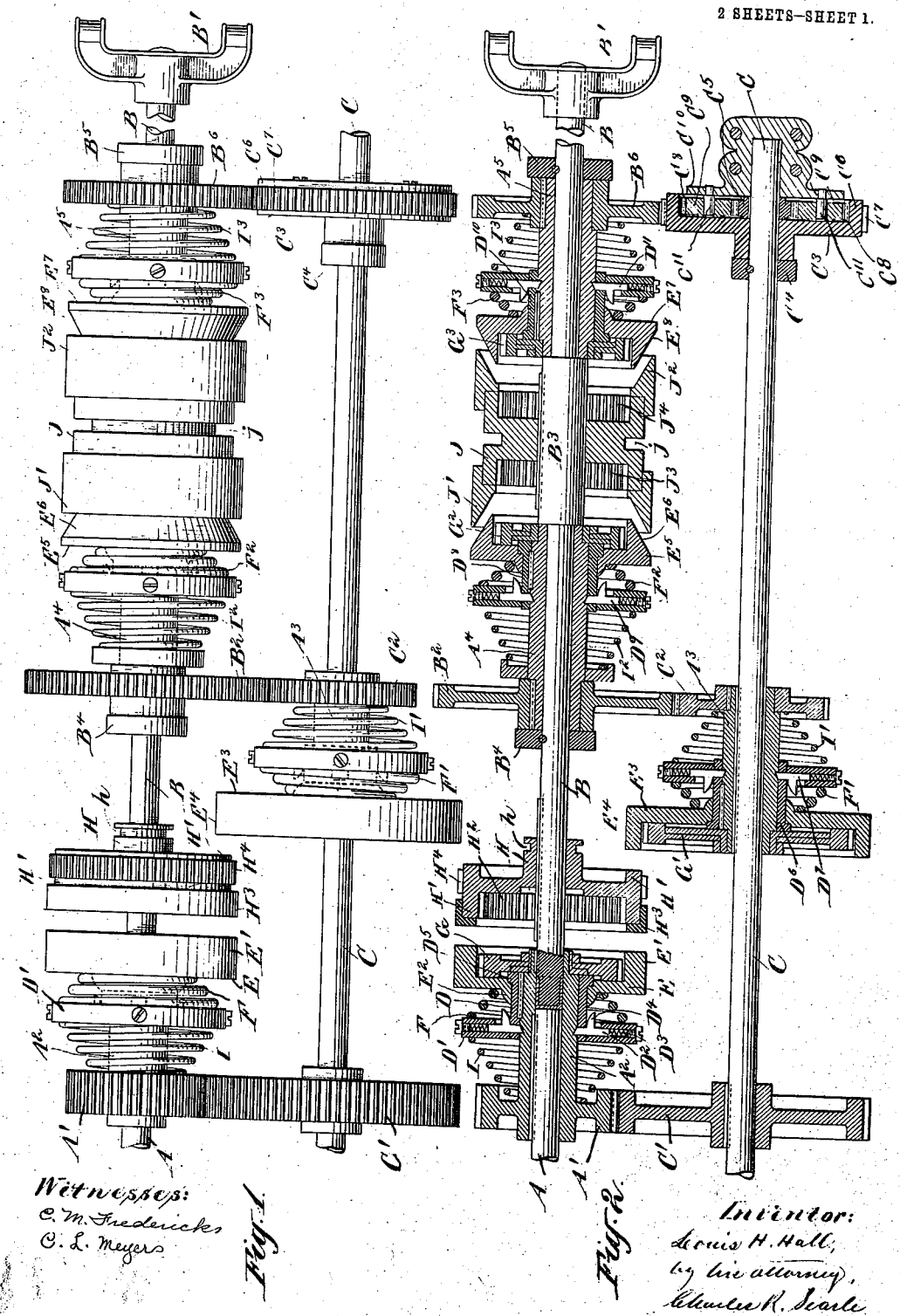

UNITED STATES PATENT OFFICE.

LOUIS H. HALL, OF NEW YORK, N. Y.

CLUTCH MECHANISM.

977,864.  Specification of Letters Patent.  Patented Dec. 6, 1910.

Application filed January 26, 1910. Serial No. 540,116.

*To all whom it may concern:*

Be it known that I, LOUIS H. HALL, a citizen of the United States, residing in the city of New York, borough of Manhattan, in the county and State of New York, have invented a certain new and useful Improvement in Clutch Mechanism, of which the following is a specification.

The invention relates to mechanism of the clutch character for transmitting motion from a driving-shaft to a driven-shaft, and the object of the invention is to provide means whereby the coupling of the shafts, and the desired speed-changes and reverse, may be effected quickly and reliably and without shock to the mechanism, and whereby the danger of fracture or derangement due to sudden coupling and changes may be greatly lessened or entirely eliminated.

The means employed provides for preliminary frictional engagement in opposition to strong yielding resistance, followed by positive engagement while still frictionally engaged, and a further object of the invention is to provide for discontinuing such strong resistance and frictional engagement as soon as positive engagement has been established, thus permitting such positive engagement to be completed unopposed and avoiding the necessity of strong pressure to maintain the positive engagement, and also relieving the shafts from excessive end-thrust due to such pressure.

The invention consists in certain novel features of construction, and arrangements of parts, by which the above objects are attained, to be hereinafter described.

The accompanying drawings form a part of this specification and show the mechanism as designed for automobile service.

Figure 1 is a plan view showing a motor-shaft, rear-drive shaft and countershaft equipped in accordance with the invention and arranged for direct-drive, intermediate, and low speeds, and reverse. Fig. 2 is a corresponding horizontal section, partly in plan view. The remaining figures are on a larger scale. Fig. 3 is a horizontal section corresponding to a portion shown in the preceding figure but with the parts differently conditioned. Fig. 4 is a vertical section and elevation, the plane of section being indicated by the line 4—4 in Fig. 3. Fig. 5 is a face view of a clutch wheel forming part of the positive engaging means. Fig. 6 is an elevation of the opposite face. Fig. 7 is a corresponding side or edge view.

Similar letters of reference indicate like parts in all the figures.

In the operations of coupling for direct-drive or high speed, and in changing to intermediate, low-speed, and to reverse, the engagement is first made frictionally and while the parts are thus connected and rotating together they are forced into positive engagement and released from frictional contact; the principle involved in performing the several change operations is the same in each case but variations are shown in the details of the clutch mechanism as found necessary or desirable by reason of the positions of the shafts relatively to each other.

A is the motor-shaft driven by any suitable motor, not shown, and B is the rear-drive shaft in line axially therewith and when coupled thereto forms in effect a continuation thereof.

C is a countershaft parallel with the motor and drive shafts and geared positively to the motor-shaft by a pinion $A^1$ on the latter in mesh with the gear-wheel $C^1$ on the former, so that the countershaft revolves with the motor-shaft but in the opposite direction and at a lower speed.

On the rear end of the drive-shaft is a yoke $B^1$ forming part of a universal joint through which the motion of the drive-shaft is transmitted as usual to the differential or other gear employed in driving the car, or performing other work, as will be understood. The several shafts are supported in suitable bearings, omitted for clearness, but which may be understood to be suitably located and of any approved type.

Referring now to the mechanism for inducing high speed or direct-drive, shown at the left in Figs. 1 and 2 and on a larger scale in Fig. 3, $A^2$ is a sleeve forming the hub of the pinion $A^1$, keyed to the shaft A and extending beyond the latter to inclose loosely the free end of the drive-shaft B.

On the rear end of the sleeve is a collar D splined to slide axially thereon and having a radial flange or head $D^1$ in which are mounted four or other number of radially sliding dogs or latches $D^2$ having beveled inner ends adapted to engage corresponding notches in the surface of the sleeve $A^2$ and hold the collar D against forward movement, toward the pinion, until released. The latches are held in engagement by springs D³ and each has a beveled arm D⁴ by which it can be raised in opposition to the force of its spring and thus released.

E is a friction-wheel having a cylindrical overhung flange E¹ forming its periphery, and splined upon the collar D to move axially thereof. It is forced rearwardly by the expansive action of a strong spiral spring F abutting at one end against the rear face of the head D¹ and at the other against the front face of the friction-wheel E in a seat formed by a beveled annular nose E², and is held normally at the rearward extent of its movement by engagement with an annular stop D⁵ at the rear end of the collar D.

Keyed upon the reduced rear-end of the sleeve A² is a clutch-wheel G, having teeth similar to those of an ordinary gear-wheel and lying normally inclosed within the overhanging flange E¹ which projects somewhat beyond its rear face, as shown in Figs. 2 and 3.

On the drive-shaft B is splined a sliding sleeve H having an annular groove $h$ for the reception of the forked end of a shifting-lever, not shown, and a peripheral overhung rim H¹ provided on its interior face with a series of teeth H² similar to those of an internal gear-wheel and constructed to engage in the spaces between the teeth of the clutch-wheel G when presented thereto.

The face of the rim H¹ adjacent to the rear face of the flange E¹ is provided with a frictional wearing surface H³, and on the periphery of the rim H¹ is a series of teeth H⁴ forming a gear-wheel, the function of which will appear later in this description.

The mechanism above described is for coupling the motor-shaft A directly to the drive-shaft B for direct-drive, and its operation is as follows:—Assuming the shaft A with its sleeve A² and connections to be revolving and the drive-shaft stationary, the sleeve H is forced forward to bring its reinforced friction-face H³ in contact with the rear face of the friction-flange E¹ and the pressure increased to overcome the initial resistance of the strong spring F causing the flange E¹ and its wheel E to move forward on the collar D; by increasing the pressure sufficient friction is developed to engage the rim H¹ and flange E¹ and compel these parts and their shafts to revolve together; a further movement still further compresses the spring F and engages the ends of the teeth H² with those of the clutch-wheel G and positive engagement is initiated, a still further movement increases such engagement and causes the annular nose E² to contact with the arms D⁴ on the latches D² and lift them out of engagement with the sleeve A². When thus released, the strong spring F immediately expands by forcing the head D¹ forwardly until the stop D⁵ on the collar D brings up against the wheel E and the spring F again assumes its normal position and tension, and the positive engagement is completed with no resistance other than the sliding friction of the teeth, and the resistance offered by a slight spiral spring I interposed between the pinion A¹ and front face of the head D¹, the function of which is to move the collar D rearwardly to reëngage the latches D² when the sleeve H is again moved rearwardly to uncouple the shafts A and B.

On the withdrawal of the latches and expansion of the spring F the strong frictional contact between the flange E¹ and rim H¹ ceases and the shaft B continues to revolve in positive engagement with the shaft A without requiring any pressure to be exerted through the sleeve H to maintain such engagement, beyond that necessary to overcome the force of the light spring I, and the end thrust on the shafts due to excessive pressure is also avoided.

Intermediate speed is induced through the countershaft C driven positively by the gear-wheel C¹ from the pinion A¹. On the countershaft near, but in rear of, the rim H¹ is a clutch mechanism similar to that above described and comprising a sleeve A³ keyed to the countershaft and carrying a toothed clutch-wheel G¹ which in this instance serves also as a gear-wheel. It is inclosed by a friction-wheel E³ having an overhung flange E⁴ arranged to lap upon the rear face of the rim H¹ when the sleeve H is thrown rearwardly from its central position, and create the necessary frictional engagement.

The friction-wheel E³ is arranged to slide axially upon the collar D⁶ which is provided with latches D⁷ and strong and weak springs F¹ and I¹ as before described; in operation the overlapping faces of the rims E⁴ and H¹ induce revolution by friction and the further movement of the sleeve H causes the teeth of the clutch-wheel G¹ to mesh with the before mentioned series of teeth H⁴ on the periphery of the flange H¹, and the release of the latches D⁷ relieves the frictional contact when positive mesh is attained. Thus connected the drive-shaft B is revolved in the same direction as before but at a lower rate of speed determined by the pinion A¹, gear-wheel C¹, clutch-wheel G¹ and series of teeth H⁴, as will be understood.

Low-speed is induced from the pinion C² on the sleeve A³ on the countershaft through the gear-wheel B². The latter is keyed to a sleeve A⁴ loosely inclosing a portion of the drive-shaft B between the forward end of an enlarged portion B³ of the shaft and a collar B⁴ fixed upon the shaft.

The sleeve A⁴ carries a clutch-wheel G², collar D⁸ latches D⁹ and springs F² and I² similar to the like parts as first described, but the friction-wheel E⁵ has a conical peripheral surface E⁶ adapted to be frictionally engaged by a conically recessed flange $J^1$ of a sliding sleeve J splined on the enlarged portion $B^3$ of the shaft and having an annular groove $j$ receiving the fork of a second shifting-lever, not shown. By moving this sliding-sleeve forwardly the conical recess in the flange $J^1$ is brought into frictional contact with the conical flange $E^6$ and the latter forced forward against the resistance offered by the spring $F^2$ until the internal teeth $J^3$ engage the teeth of the clutch-wheel $G^2$ and the spring $F^2$ is released. Thus conditioned the drive-shaft is revolved in the same direction as before but at the still lower rate determined by the proportions of the pinion $A^1$, gear-wheel $C^1$, pinion $C^2$ and gear-wheel $B^2$ through the slide J.

The reverse motion is produced by mechanism in all respects similar to that just described for low-speed, through the medium of a reverse-motion gear on the countershaft, consisting of a disk $C^3$ loosely encircling the countershaft, held between a collar $C^4$ and pinion $C^5$ fixed on such shaft, and having an overhung flange $C^6$ carrying exterior gear teeth $C^7$ and internal gear teeth $C^8$; the latter are in mesh with one or more pinions $C^9$ revolubly mounted on pins $C^{11}$ set in the stationary disk $C^{10}$ and meshing with the center pinion $C^5$.

The pinions $C^9$ and $C^5$ and internal gear $C^8$ serve in the well known manner to rotate the disk $C^3$ in the direction opposite to the revolution of the countershaft C.

By moving the sliding-sleeve J rearwardly the conical friction-surface $J^2$ on the rear end of the sleeve is brought into frictional contact with the correspondingly shaped cone $E^8$ forming the rim of the friction-wheel $E^7$ which is mounted as before on the collar $D^{10}$ carrying latches $D^{11}$ and springs $F^3$ and $I^3$, the whole mounted on a loose sleeve $A^5$ held between the rear end of the enlargement $B^3$ and the collar $B^5$.

A toothed clutch-wheel $G^3$ keyed to the sleeve $A^5$ receives the internal teeth $J^4$ of the sliding-sleeve J, and a gear-wheel $B^6$ keyed upon the sleeve is in mesh with the teeth $C^7$ on the exterior of the flange $C^6$, thus conditioned motion is communicated from the motor-shaft through the pinion $A^1$ and gear-wheel $C^1$ to the countershaft and from the latter, reversed by the pinions $C^5$ $C^9$, through the flange $C^6$ and gear-wheel $B^6$ to the drive-shaft B at a rate determined by the proportions of the several gears.

By the mechanism shown, the initial frictional contact is light and gradually increases until motion is established between or by the parts, which are then positively engaged, and after such engagement is fully established, the frictional contact is relieved, thus permitting the required changes to be made easily and quickly but so smoothly as to avoid undue shock.

In order to facilitate the positive engagement, the teeth of the several clutch-wheels and those of their engaging wheels are pointed on the ends presented toward each other as at $G^4$, see Fig. 7, to reduce the area of the opposed plane faces and enable the teeth of each wheel to glide easily into the spaces between the teeth of the other.

As a further means of increasing such ease of engagement the clutch-wheels are preferably constructed as shown in Figs. 3, 5, 6 and 7 in which L is a boss or hub arranged to be keyed upon the sleeve on which it is mounted, having a radial flange $L^1$ partially cut away to form oppositely located segmental wings $L^2$ $L^2$ matching to the recessed face of the wheel G loosely mounted on the hub L and confined between the flange $L^1$ and collar $L^3$ thereon. The wheel has segmental lugs $G^5$ $G^5$ received in the spaces between the wings, permitting a degree of lost motion but compelling the rotation of the wheel by contact with such wings.

In the collar $L^3$ on the face adjacent to the wheel G is a groove $l$ extending circumferentially and receiving two curved helical springs $L^4$ separated by the head $G^6$ of a pin $G^7$ set in the wheel and extending into the groove between them. Thus arranged the wheel is held yieldingly upon the hub with the lugs $G^5$ $G^5$ approximately in the central position relatively to the wings $L^2$ $L^2$, and may move slightly as required to permit the teeth to engage readily, and when thus engaged be rotated positively by the contact of the wings with the lugs.

Modifications may be made in the forms and proportions within wide limits without departing from the invention, and parts may be used without the whole. Other means for reversing the motion of the disk $C^3$ relatively to the countershaft may be employed.

Although the invention is described as applied to a motor vehicle, it will be understood that it will serve for any purposes and in any situations to which it may be adapted.

I claim:—

1. In a device of the character set forth, a revolving driving-member and a revoluble driven-member, frictional means mounted on one of said members and movable into frictional contact with the other, positive engaging means carried by said members and arranged to be engaged by a continuation of such movement of said frictional means, means for maintaining the force of said frictional contact until said positive engagement is effected and means actuated by such movement for releasing said frictional engagement after said positive engagement is established.

2. In a device of the character set forth, a revolving driving-member and revoluble driven-member, frictional means mounted on one of said members and movable into frictional contact with the other, compressible yielding means opposing such movement, positive engaging means carried by said members and arranged to be engaged by a continuation of such movement of said frictional means, said opposing yielding means constructed to maintain the force of said frictional contact until said positive engagement is effected and means actuated by such movement for discontinuing such frictional engagement by releasing said yielding means after said positive engagement is established.

3. In a device of the character set forth, a driving-shaft and a driven-shaft, a friction-wheel carried by each of said shafts, means for moving one of said wheels axially into contact with the other to induce rotation of said driven-shaft, toothed means carried by each of said shafts and constructed to engage initially by the movement of said friction-wheels, a spring opposing such movement, and means actuated by such movement for releasing said spring from tension and discontinuing such frictional contact when engagement of said toothed means is established.

4. In a device of the character set forth, a driving-shaft and a driven-shaft, a friction-wheel carried by each of said shafts and movable arially thereon, an axially movable abutment carried on one of said shafts, a latch in said abutment holding the latter against axial movement, a spring between said abutment and one of said friction-wheels, latch-releasing means carried by such wheel, means for moving said wheels into frictional engagement in opposition to the force of said spring, positive engaging means carried by said shafts and arranged to be initially engaged by such movement of said wheels, said latch-releasing means constructed automatically to actuate said latch and release the tension of said spring, whereby said frictional engagement is discontinued when such positive engagement is established.

5. A driving-shaft, a friction-wheel movable axially thereon, a spring opposing such movement, an abutment for said spring, a latch holding said abutment, latch-releasing means carried by said wheel and actuated by the movement of the latter in compressing said spring, a driven-shaft, a friction-wheel movable axially thereon and adapted to be moved into frictional contact with the friction-wheel on said driving-shaft in opposition to the force of said spring.

6. A driving-shaft, a collar movable axially thereon, a head on said collar, a friction-wheel movable axially on said collar, a spring between said head and wheel, a stop on said collar for limiting the movement of said wheel thereon, a latch in said head holding said collar against axial movement, means carried by said wheel for releasing said latch, a driven-shaft, a friction-wheel thereon movable axially and adapted to be moved into frictional contact with the friction-wheel on said driving-shaft in opposition to the force of said spring, and positive engaging means on said shafts adapted to be initially engaged by the axial movement of said wheels.

7. A driving-shaft, a collar movable axially thereon, a head on said collar, a friction-wheel movable axially on said collar, an overhung flange on said wheel, a toothed wheel revoluble with said shaft and inclosed by said flange, a spring between said head and friction-wheel, a stop on said collar for engaging said friction wheel and limiting its movement from said head, a latch in said head holding said collar against axial movement, a nose on said friction-wheel for releasing said latch, a driven-shaft, a friction-wheel movable axially thereon and having a friction-rim adapted to engage said friction-flange, and teeth on said friction-rim arranged to engage the teeth on said toothed wheel.

8. A driving-shaft, a collar movable axially thereon, a head on said collar, a friction-wheel movable axially on said collar, an overhung flange on said wheel, a toothed wheel revoluble with said shaft and inclosed by said flange, a spring between said head and friction-wheel, a stop on said collar for engaging said friction-wheel and limiting its movement from said head, a latch in said head holding said collar against axial movement, a nose on said friction-wheel for releasing said latch, a driven-shaft, a friction-wheel movable axially thereon and having a friction-rim adapted to engage said friction-flange, teeth on said friction-rim adapted to engage the teeth on said toothed wheel, and a spring acting upon said head in opposition to the first-mentioned spring.

9. A driving-shaft, a collar movable axially thereon, a head on said collar, an overhung flange on said wheel, a peripherally toothed wheel revoluble with said shaft and inclosed by said flange, a spring between said head and friction-wheel, a spring acting upon the opposite face of said head in opposition to said first-mentioned spring, a stop on said collar for engaging said friction-wheel and limiting its movement from said head, a latch in said head holding said collar against axial movement, a nose on said friction-wheel for releasing said latch, a driven-shaft, a friction-wheel thereon and movable axially thereof and having an overhung friction-rim adapted to engage said friction-flange, and teeth on the interior of said friction-rim arranged to engage the peripheral teeth on said toothed wheel.

10. In a device of the character set forth, a driving-shaft and a driven-shaft, a friction-wheel carried by each of said shafts, means for moving one of said wheels axially into frictional engagement with the other to induce rotation of said driven-shaft, a spring opposing such movement, and positive engaging means carried by said shafts and comprising a hub on one shaft, a toothed rim loosely mounted to rotate on said hub, stops on said hub, a lug on said rim between said stops, springs abutting at one end against said hub and at the other against a head on said rim, and teeth carried by the other of said shafts and adapted to engage said toothed rim.

In testimony that I claim the invention above set forth I affix my signature, in presence of two witnesses.

LOUIS H. HALL.

Witnesses:
CHARLES R. SEARLE,
WALLY E. YOUNG.